(12) United States Patent
Park et al.

(10) Patent No.: US 11,513,308 B2
(45) Date of Patent: Nov. 29, 2022

(54) CAMERA MODULE

(71) Applicant: Samsung Electro-Mechanics Co., Ltd., Suwon-si (KR)

(72) Inventors: Nam Ki Park, Suwon-si (KR); Soo Cheol Lim, Suwon-si (KR); Byung Woo Kang, Suwon-si (KR); Sung Taek Oh, Suwon-si (KR); Young Bok Yoon, Suwon-si (KR); Bo Sung Seo, Suwon-si (KR); Oh Byoung Kwon, Suwon-si (KR); Jun Sup Shin, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 336 days.

(21) Appl. No.: 16/823,915

(22) Filed: Mar. 19, 2020

(65) Prior Publication Data

US 2020/0310079 A1 Oct. 1, 2020

(30) Foreign Application Priority Data

Apr. 1, 2019 (KR) .................... 10-2019-0037786
Dec. 13, 2019 (KR) .................... 10-2019-0166810

(51) Int. Cl.
*G02B 7/04* (2021.01)
*G03B 13/34* (2021.01)

(52) U.S. Cl.
CPC ............... *G02B 7/04* (2013.01); *G03B 13/34* (2013.01)

(58) Field of Classification Search
CPC ... G02B 7/04; G02B 7/02; G02B 7/00; G03B 13/34; G03B 13/32
USPC .................................................. 359/824
See application file for complete search history.

(56) References Cited

U.S. PATENT DOCUMENTS

| 10,747,013 B2 | 8/2020 | Lim | |
| 2010/0284097 A1 | 11/2010 | Masuki | |
| 2011/0019985 A1 | 1/2011 | Chiu et al. | |
| 2012/0224075 A1* | 9/2012 | Lim | G03B 17/02 348/208.11 |
| 2015/0346453 A1 | 12/2015 | Cheong et al. | |
| 2016/0025995 A1* | 1/2016 | Ariji | G02B 7/023 359/557 |
| 2016/0246029 A1* | 8/2016 | Kim | G02B 7/08 |

(Continued)

FOREIGN PATENT DOCUMENTS

| CN | 101969530 A | 2/2011 |
| CN | 105278072 A | 1/2016 |

(Continued)

OTHER PUBLICATIONS

Korean Office Action dated Sep. 11, 2020 in counterpart Korean Patent Application No. 10-2019-0166810 (6 pages in English and 5 pages in Korean).

(Continued)

*Primary Examiner* — William R Alexander
(74) *Attorney, Agent, or Firm* — NSIP Law

(57) ABSTRACT

A camera module includes: a magnet disposed on a lens module; a bearing member disposed in a ball guide portion formed between the lens module and a housing that accommodates the lens module; a coil disposed in the housing to face the magnet; and a yoke member disposed on the housing to interact with the magnet to generate a biased magnetic force.

20 Claims, 13 Drawing Sheets

(56) References Cited

U.S. PATENT DOCUMENTS

| | | | |
|---|---|---|---|
| 2017/0017056 A1 | 1/2017 | Park et al. | |
| 2017/0052387 A1 | 2/2017 | Yu et al. | |
| 2017/0059880 A1 | 3/2017 | Fujinaka | |
| 2017/0108705 A1 | 4/2017 | Yu et al. | |
| 2017/0139225 A1 | 5/2017 | Lim | |
| 2018/0164537 A1 | 6/2018 | Lee | |
| 2018/0173081 A1 | 6/2018 | Kim et al. | |
| 2018/0343370 A1* | 11/2018 | Park | G03B 9/04 |
| 2019/0104239 A1 | 4/2019 | Aschwanden et al. | |

FOREIGN PATENT DOCUMENTS

| | | |
|---|---|---|
| CN | 106291862 A | 1/2017 |
| CN | 106461908 A | 2/2017 |
| CN | 106462029 A | 2/2017 |
| CN | 106707454 A | 5/2017 |
| CN | 107546926 A | 1/2018 |
| CN | 108141518 A | 6/2018 |
| CN | 108181775 A | 6/2018 |
| CN | 108333791 A | 7/2018 |
| CN | 207636905 U | 7/2018 |
| CN | 108732714 A | 11/2018 |
| CN | 109073791 A | 12/2018 |
| EP | 2 937 726 A1 | 10/2015 |
| JP | 2009-169359 A | 7/2009 |
| JP | 2011-150086 A | 8/2011 |
| JP | 2014-160195 A | 9/2014 |
| JP | 2017-46569 A | 3/2017 |
| JP | 2018-197834 A | 12/2018 |
| JP | 2018197834 * 12/2018 | ............... G02B 7/04 |
| KR | 10-2013-0071840 A | 7/2013 |
| KR | 10-1640565 B1 | 7/2016 |
| KR | 10-2017-0056387 A | 5/2017 |
| KR | 10-1765281 B1 | 8/2017 |
| KR | 10-2018-0063404 A | 6/2018 |
| WO | WO 2013/094963 A1 | 6/2013 |
| WO | WO 2017/150774 A1 | 9/2017 |
| WO | WO 2018/012733 A1 | 1/2018 |

OTHER PUBLICATIONS

Chinese Office Action dated Jan. 17, 2022, in counterpart Chinese Patent Application No. 202010249150.1 (4 pages in English and 7 pages in Chinese).

Chinese Office Action dated May 21, 2021 issued in counterpart Chinese Patent Application No. 202010249150.1 (10 pages in English)(11 pages in Chinese).

* cited by examiner

I-I

II-II

III-III

IV-IV

CAMERA MODULE

CROSS-REFERENCE TO RELATED APPLICATION

This application claims the benefit under 35 USC 119(a) of Korean Patent Application No. 10-2019-0037786, filed on Apr. 1, 2019 in the Korean Intellectual Property Office, and Korean Patent Application No. 10-2019-0166810, filed on Dec. 13, 2019 in the Korean Intellectual Property Office, the entire disclosures of which are incorporated herein by reference for all purposes.

BACKGROUND

1. Field

The following description relates to a camera module configured to minimize a tilting phenomenon occurring during movement of a lens barrel in an optical axis direction.

2. Description of Background

A camera module may be capable of adjusting a focus. For example, a lens barrel may be moved in an optical axis direction by an actuator so that the camera module may adjust a focus. The movement of the lens barrel is typically guided by a bearing. More specifically, a plurality of ball bearings is disposed between a housing and the lens barrel of the camera module, thereby enabling smooth movement of the lens barrel. However, since such a structure may cause partial separation of contact between the ball bearings and the lens barrel due to a manufacturing tolerance, a phenomenon in which the lens barrel is biased to one side during the movement may occur.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module configured to move a lens barrel in an optical axis direction.

In one general aspect, a camera module includes: a magnet disposed on a lens module; a bearing member disposed in a ball guide portion formed between the lens module and a housing that accommodates the lens module; a coil disposed in the housing to face the magnet; and a yoke member disposed on the housing and configured to interact with the magnet to generate a biased magnetic force.

The yoke member may be asymmetrical with respect to an optical axis of the lens module.

The yoke member may include a protrusion that protrudes toward the magnet.

The protrusion may be disposed inside of a winding of the coil.

The protrusion may be disposed outside of a winding of the coil.

The yoke member may have a first surface area in a first region disposed on a first side of an optical axis of the lens module and a second surface area different from the first surface area in a second region disposed on a second side of the optical axis opposite the first side.

The yoke member may have a first mass in a first region disposed on a first side of an optical axis of the lens module and a second mass different from the first mass in a second region disposed on a second side of the optical axis opposite the first side.

The bearing member may be disposed in an optical axis direction of the lens module.

The bearing member may include first bearings of a first size and second bearings of a second size greater than the first size.

The first bearings may be disposed between a first one of the second bearings and a second one of the second bearings along the optical axis direction.

The first bearings may include a first set of the first bearings disposed on a first side of the yoke member and a second set of the first bearings disposed on a second side of the yoke member opposite the first side, a number of first bearings in the first set being different than a number of first bearings in the second set.

The second bearings may include a first set of the second bearings disposed on a first side of the yoke member and a second set of the second bearings disposed on a second side of the yoke member opposite the first side, a number of second bearings in the first set being the same as a number of second bearings in the second set.

In another general aspect, a camera module includes a lens module configured to move by rolling friction in an optical axis direction; a magnet and a coil configured to provide a driving force required to move the lens module in the optical axis direction; a yoke member disposed to face the magnet; and a protrusion disposed on the yoke member and disposed closer to the magnet than the yoke member.

The protrusion may be biased toward one side of the yoke member.

The protrusion may include protrusions disposed with a gap therebetween in the optical axis direction.

In another general aspect, a camera module includes a housing including a yoke and a coil disposed on the yoke; and a lens module including a magnet disposed to face the coil and configured to interact with the coil to move the lens module within the housing along a direction of an optical axis of the lens module. The yoke is asymmetrical with respect to the optical axis in at least one of a surface area of a surface on which the coil is disposed, a mass, and a shape.

The yoke may include a protrusion protruding from the surface on which the coil is disposed toward the magnet, and the protrusion may be offset with respect to the optical axis.

The protrusion may be disposed between a portion of the coil and the optical axis.

The protrusion may be disposed farther away from the optical axis than the coil and may extend in a direction parallel to the optical axis.

A length of the protrusion in the direction parallel to the optical axis may be less than or equal to an extension length of the coil in an optical axis direction.

The lens barrel can be stably moved in the optical axis direction, thereby alleviating a deterioration in the quality of the camera module caused due to a tilting phenomenon of the lens barrel.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
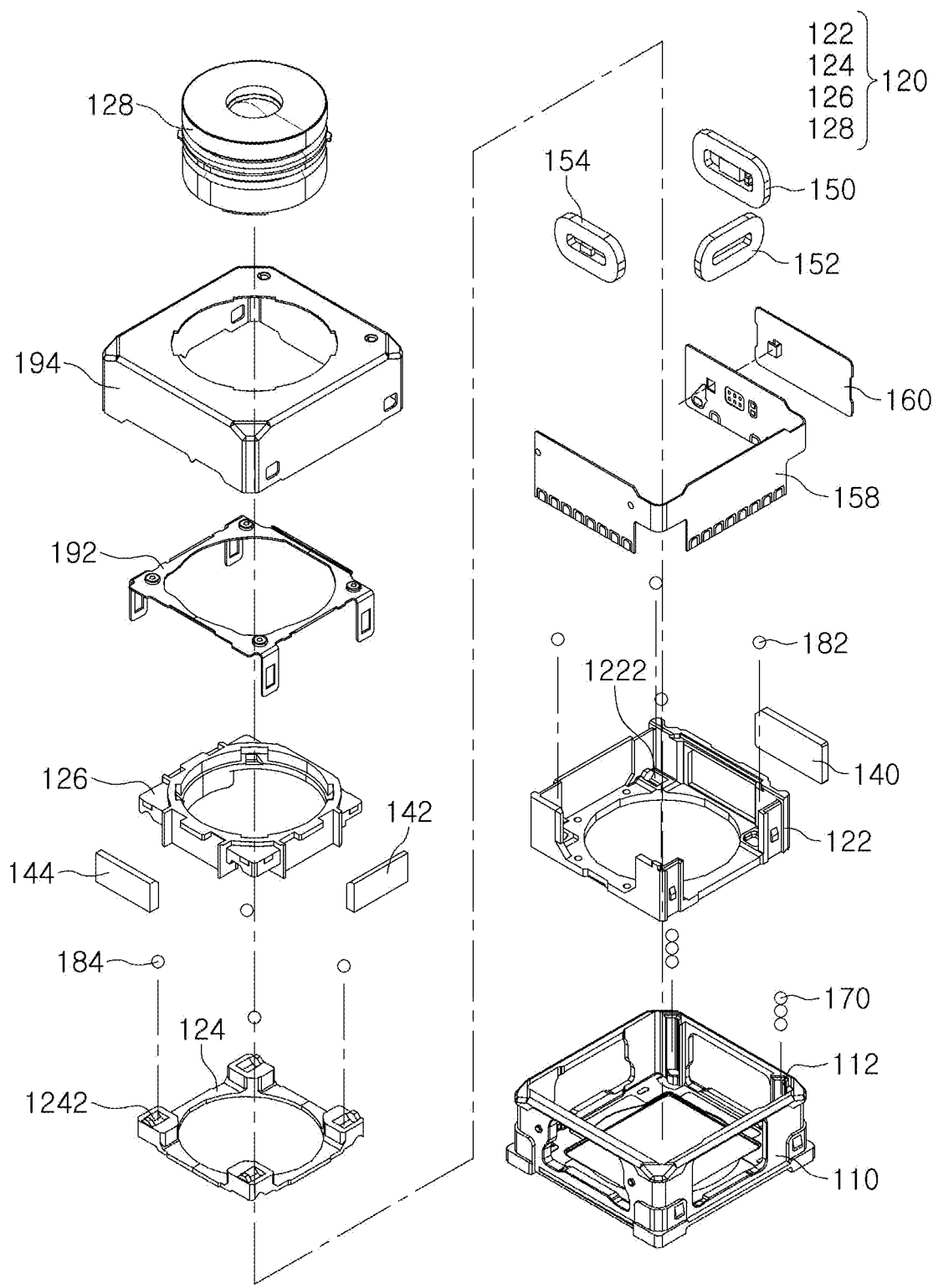
FIG. 1 is an exploded perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
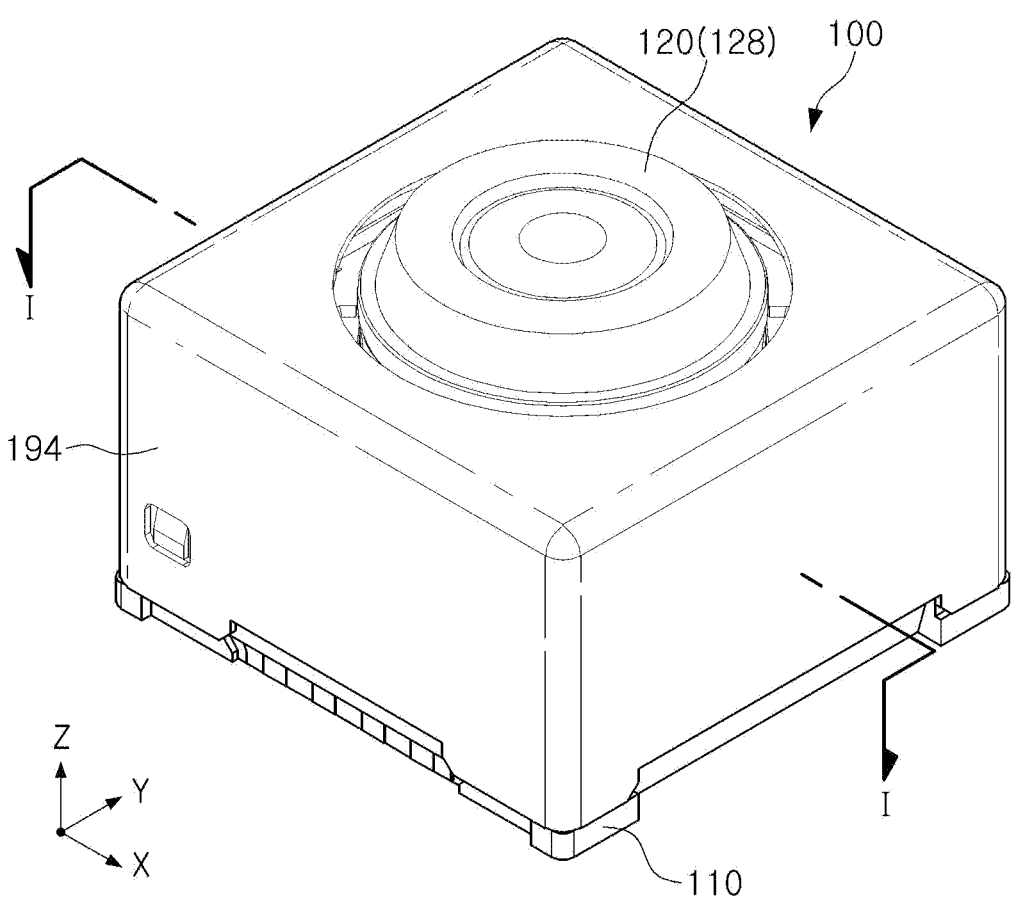
FIG. 2 is an assembled perspective view of the camera module illustrated in FIG. 1.

A camera module according to an example will be described with reference to FIGS. 1 and 2.

A camera module 100 may include a housing 110 and a lens module 120. However, the configuration of the camera module 100 is not limited to the housing 110 and the lens module 120. For example, the camera module 100 may further include a shield can 194 covering a substantial portion of the housing 110. The camera module 100 may include a driving assembly. For example, the camera module 100 may include a driving assembly for driving the lens module 120 in an optical axis direction (Z direction in FIG. 2) or in a direction intersecting the optical axis direction. The driving assembly may include a first driving assembly and a second driving assembly. The first driving assembly may be configured to perform a focus adjustment function, and the second driving assembly may be configured to perform an optical image stabilization function. Each driving assembly may include a magnet and a coil.

The housing 110 may be configured to accommodate the lens module 120. For example, a space for accommodating the lens module 120 may be elongated in the optical axis direction in the housing 110. The driving assembly may be disposed in the housing 110. For example, coils 150, 152 and 154 (first coil 150 and second coils 152 and 154, respectively) for the driving assembly may be disposed on three side surfaces of the housing 110. The coils 150, 152 and 154 may be oval in form and extend extends lengthwise in a direction intersecting an optical axis. Further, a flexible circuit board 158 may be disposed on the housing 110. For example, the flexible circuit board 158 may be disposed to surround three side surfaces of the housing 110, as illustrated in FIG. 1. The flexible circuit board 158 may be electrically connected to the coils 150, 152, and 154. The coil 150 and a yoke member 160 may be disposed on the flexible circuit board 158. For example, the coil 150 may be disposed on a front surface of the flexible circuit board 158, and the yoke member 160 may be disposed on a rear surface of the flexible circuit board 158.

The coils 150, 152, and 154 may be disposed on respective surfaces of the flexible circuit board 158 to be electrically connected to the flexible circuit board 158. The housing 110 may accommodate an image sensor (not shown). For example, a board on which the image sensor is mounted may be disposed on the bottom of the housing 110.

The housing 110 and the lens module 120 may have a space formed to dispose a plurality of rolling members (e.g., bearing members). For example, ball guide portions 112 extending in the optical axis direction may be formed on one surface where the housing 110 and the lens module 120 face each other. The ball guide portions 112 are formed to enable the lens module 120 to move in the optical axis direction. For example, the ball guide portions 112 may be elongated in the optical axis direction. Bearing members 170 may be disposed in the ball guide portions 112 provided between the housing 110 and the lens module 120.

The lens module 120 may include one or more lenses. The lens module 120 may be configured to perform a focus adjustment function. For example, the lens module 120 may be freely moved in the optical axis direction in the housing 110 by the bearing members. The lens module 120 may be configured to perform an optical image stabilization function. For example, some members of the lens module 120 may be moved by the bearing members in the direction intersecting the optical axis in the housing 110 or on another member of the lens module 120.

The lens module 120 may include a plurality of members. For example, the lens module 120 may include a first frame 122, a second frame 124, and a third frame 126.

The first frame 122 may be configured to be accommodated in the housing 110. The first frame 122 may be moved in the optical axis direction within the housing 110. First guide grooves 1222 accommodating a plurality of first rolling members 182 may be formed in the first frame 122. The first guide grooves 1222 may be elongated in a first direction intersecting the optical axis. A part of the first driving assembly may be disposed in the first frame 122. For example, a first magnet 140 may be disposed on a first side surface of the first frame 122. The first magnet 140 may be positioned to face the first coil 150 and the yoke member 160 disposed in the housing 110.

The second frame 124 may be configured to be accommodated in the first frame 122. The second frame 124 may be configured to be moved in the first direction intersecting the optical axis. For example, the second frame 124 may be moved along the first guide grooves 1222 in the first direction intersecting the optical axis. The first rolling members 182 disposed in the first guide grooves 1222 may enable the second frame 124 to be smoothly moved. A space for disposing second rolling members 184 may be formed in the second frame 124. For example, a plurality of second guide grooves 1242 may be formed in the second frame 124. The second guide grooves 1242 may be formed in a direction different from that of the first guide grooves 1222. For example, the second guide grooves 1242 may be elongated in a second direction intersecting the optical axis.

The third frame 126 may be configured to be accommodated in the second frame 124. The third frame 126 may be configured to be moved in the direction intersecting the optical axis. For example, the third frame 126 may be moved along the second guide grooves 1242 in the second direction intersecting the optical axis. The second rolling members 184 disposed in the second guide grooves 1242 may enable the second frame 124 to be smoothly moved. Some components of the second driving assembly may be disposed in the third frame 126. For example, second magnets 142 and 144 may be disposed on two side surfaces of the third frame 126, respectively. The second magnets 142 and 144 may be disposed to face the second coils 152 and 154, respectively, which are disposed in the housing 110 through open spaces of the first frame 122. The second magnets 142 and 144 may be disposed not to overlap with the first magnet 140. More specifically, the first magnet 140 and the second magnets 142 and 144 may be disposed to face different side surfaces of the housing 110 from each other. The third frame 126 may be coupled to a lens barrel 128, which is part of the lens module 120. For example, the cylindrical lens barrel 128 may be firmly seated in a vertically open space of the third frame 126. The lens barrel 128 may be configured to refract light reflected from a subject to the image sensor. To this end, the lens barrel 128 may include one or more lenses.

The camera module 100 may include components for moving the lens module 120 in the optical axis direction. For example, the camera module 100 may include the first driving assembly (including the first magnet 140, the first coil 150, and the yoke member 160) for moving the lens module 120 in the optical axis direction. The first driving assembly may move the lens module 120 toward an object or toward the image sensor through the first magnet 140 and the first coil 150. The camera module 100 may adjust a focus by moving the lens module 120 in the optical axis direction.

The camera module 100 may further include components for moving the lens module 120 in the direction intersecting the optical axis. For example, the camera module 100 may include a second driving assembly (including the second magnets 142 and 144 and the second coils 152 and 154) for moving a part of the lens module 120 in the direction intersecting the optical axis. The second driving assembly may move the part of the lens module 120 in the first direction and the second direction intersecting the optical axis. For example, the second magnets 142 and 144 and the second coils 152 and 154 may move the second frame 124 and the third frame 126 in the first direction intersecting the optical axis or move the third frame 126 in the second direction intersecting the optical axis. The camera module 100 may perform an optical image stabilization function by moving the frames (including the first frame 122, the second frame 124, and the third frame 126) in the first direction and the second direction intersecting the optical axis. A frame support member 192 may be disposed between the third frame 126 and the shield can 194.

Figure 3:
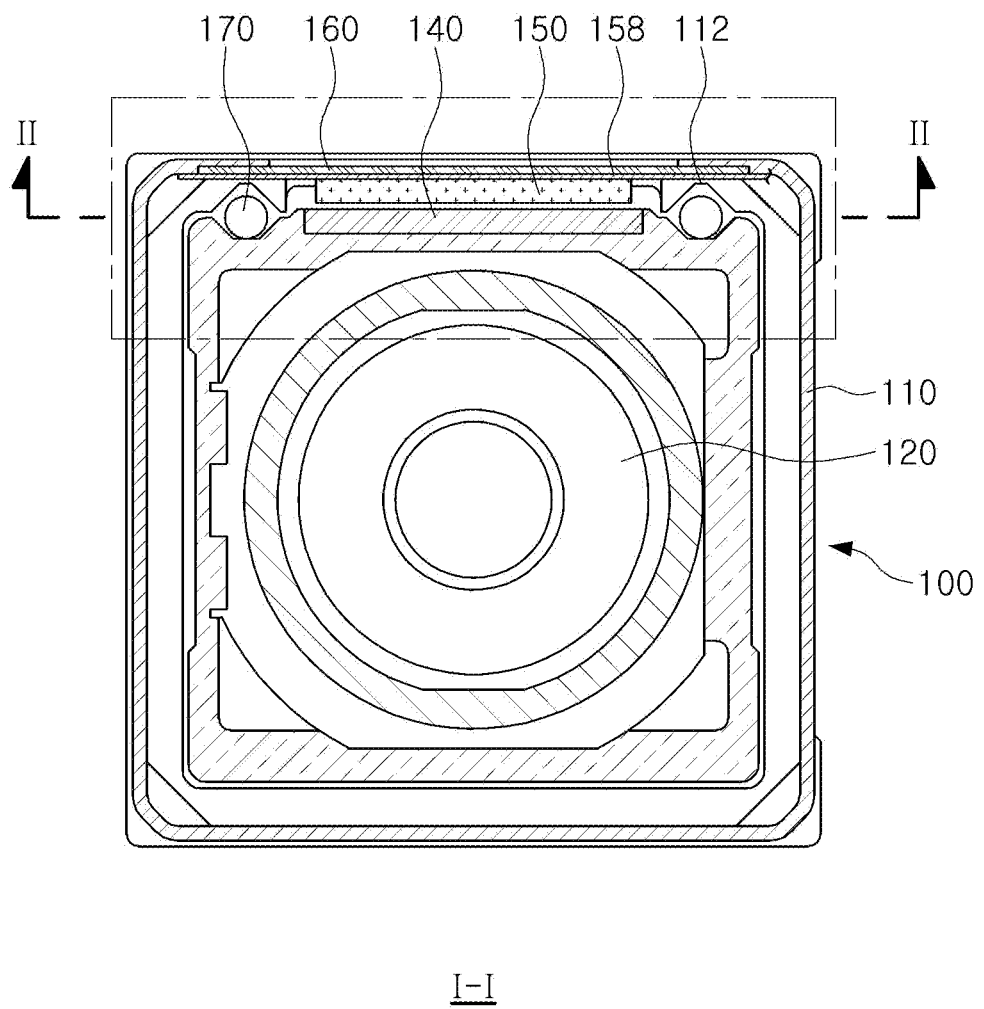
FIG. 3 is a cross-sectional view of the camera module taken along line I-I of FIG. 2.
Figure 4:
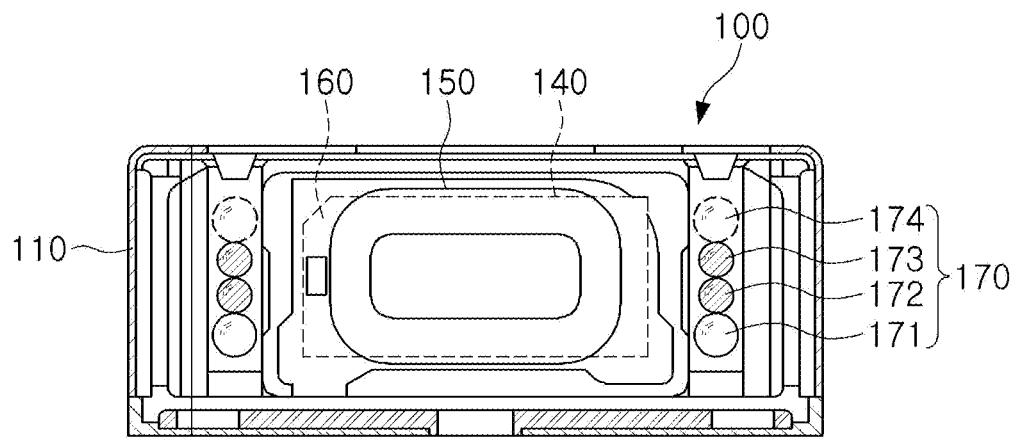
FIG. 4 is a cross-sectional view of the camera module taken along line II-II of FIG. 3.

An internal configuration of the camera module will be described with reference to FIGS. 3 and 4.

The camera module 100 may include the first driving assembly for moving the lens module 120 in the optical axis direction as described above. For example, the camera module 100 may include the first magnet 140, the first coil 150, and the yoke member 160 as one form of the driving assembly. The first magnet 140 may be disposed on the lens module 120, and the first coil 150 and the yoke member 160 may be disposed on the housing 110. The first magnet 140 and the first coil 150 may be disposed to face each other. Therefore, the lens module 120 may be moved in the optical axis direction by a magnetic force generated between the first magnet 140 and the first coil 150.

The camera module 100 may include a friction reduction assembly (or a rolling contact assembly) for the lens module 120 to be smoothly moved in the optical axis direction. For example, the camera module 100 may include the plurality of bearing members 170.

The bearing members 170 may be disposed in the ball guide portions 112 provided between the housing 110 and the lens module 120. The bearing members 170 may be continuously disposed in the optical axis direction as illustrated in FIGS. 3 and 4. The bearing members 170 may have different sizes. For example, the bearing members 170 may include first bearings 172 and 173 of a first size and second bearings 171 and 174 of a second size greater than the first size.

The first bearings 172 and 173 may be disposed between the second bearings 171 and 174. In other words, the first bearings 172 and 173 may be disposed between the second bearing 171 and the second bearing 174. The bearing members 170 configured as described above may minimize contact friction with the lens module 120 while smoothly guiding the movement of the lens module 120 in the optical axis direction.

Figure 5:
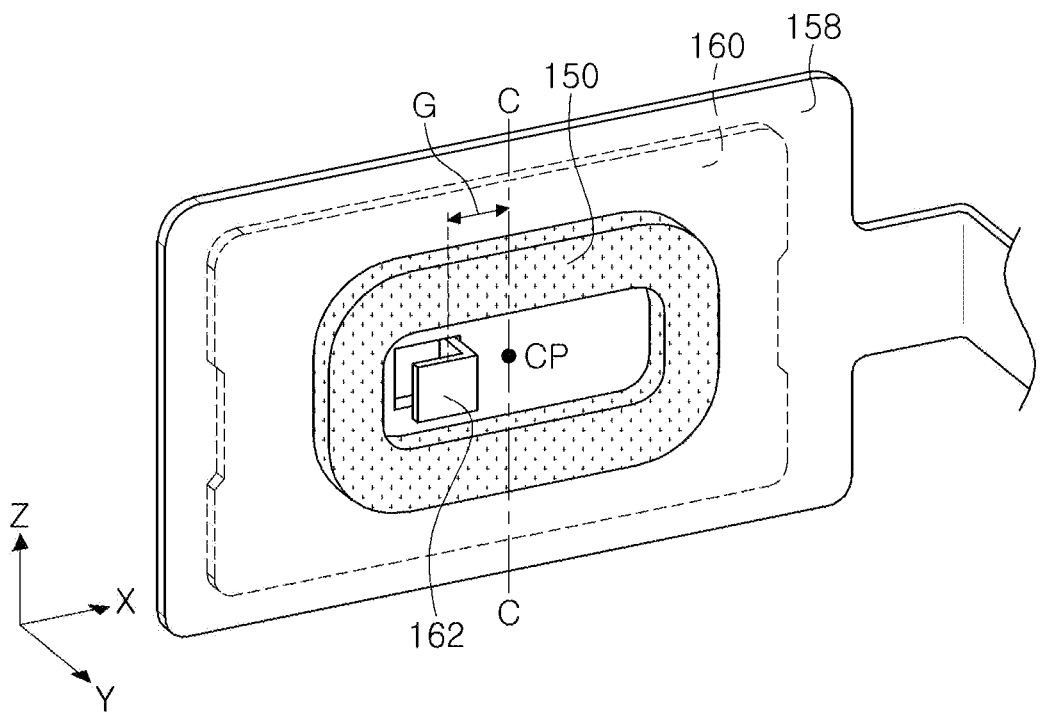
FIG. 5 is a configuration view of a yoke member illustrated in FIG. 4.

A yoke member of the camera module according to an example will be described in detail with reference to FIG. 5.

The yoke member 160 may be configured to alleviate a rattling (tilting phenomenon) occurring when the lens module 120 moves in the optical axis direction. For example, the yoke member 160 may be configured to generate a magnetic force biased to the first magnet 140 of the lens module 120 to enable stable movement of the lens module 120. As one form therefor, the yoke member 160 may include a protrusion 162 protruding toward the first magnet 140 of the lens module 120. The protrusion 162 may be formed to be closer to the first magnet 140 than the yoke member 160. The protrusion 162 may be formed in a space surrounded by the coil 150, as illustrated in FIG. 5. However, the position at which the protrusion 162 is formed is not limited to the configuration illustrated in FIG. 5.

The protrusion 162 may be formed to be biased to one side in a major axis direction (X-axis direction) of the coil 150 from a winding center CP (through the optical axis direction C-C) of the coil 150. A spacing distance G between the protrusion 162 and the winding center CP may be determined by a protruding size of the protrusion 162, a magnitude of the magnetic force of the first magnet 140, and the like. For example, when the protruding size is small or the magnetic force of the magnet 140 is weak, the spacing distance may be increased. On the other hand, when the protruding size is large or the magnetic force of the magnet 140 is strong, the spacing distance may be reduced.

The protrusion 162 may be integrally formed with the yoke member 160. For example, the protrusion 162 may be a portion formed by bending or pressing a part of the yoke member 160. As another example, the protrusion 162 may be formed by a yoke member of a different size that is added to the yoke member 160. As another example, the protrusion 162 may be formed on the yoke member 160 through surface mounting technology (SMT).

The yoke member 160 formed as described above may form a magnetic attraction force of a magnitude biased with respect to the first magnet 140. That is, a left region (refer to FIG. 4) of the yoke member 160 on which the protrusion 162 is formed may form a stronger magnetic attraction force with the first magnet 140 than a right region of the yoke member 160 not including a protrusion. Therefore, the lens module 120 may be moved in a state in which the lens module 120 closely adheres to the bearing members 170 at one side by the biased magnetic force between the first magnet 140 and the yoke member 160.

The magnetic attraction force formed between the protrusion 162 and the magnet 140 may be determined at a magnitude that may offset the rattling due to a tolerance between the lens module 120 and the bearing members 170 or between the lens module 120 and the housing 110. For example, when the tolerance between the lens module 120 and the bearing members 170 or between the lens module 120 and the housing 110 is large, the size of the protrusion 162 may be increased or the first magnet 140 having a strong magnetic force may be used to cause a large magnetic attraction force between the protrusion 162 and the first magnet 140. On the other hand, when the tolerance between the lens module 120 and the bearing members 170 or between the lens module 120 and the housing 110 is small, the size of the protrusion 162 may be reduced or the first magnet 140 having a weak magnetic force may be used to cause a magnetic attraction force between the protrusion 162 and the first magnet 140.

Other examples of the yoke member will be described below with reference to FIGS. 6 through 11.

First, another example of the yoke member will be described with reference to FIG. 6.

Figure 6:
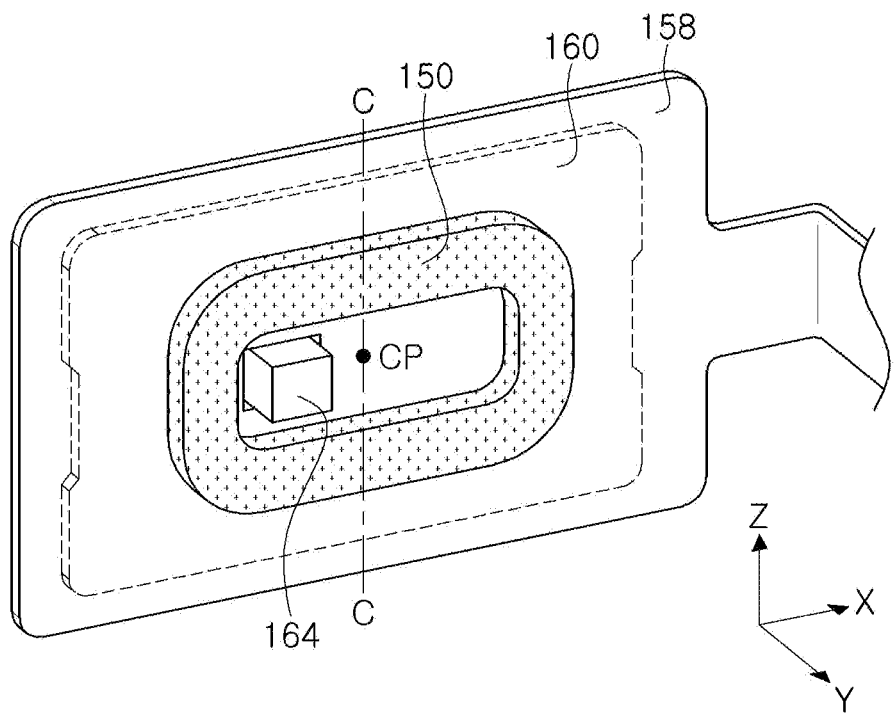
FIG. 6 is a perspective view of a yoke member according to an example.

The yoke member 160 of FIG. 6 is distinguished from the example described above in the form of a protrusion 164. For example, the protrusion 164 may be formed by attachment to the yoke member 160 through a later process. The protrusion 164 may be coupled to the yoke member 160 by a glue or another method. The protrusion 164 may be in the form of a material which is substantially the same as or similar to that of the yoke member 160.

Another example of the yoke member will be described with reference to FIG. 7.

Figure 7:
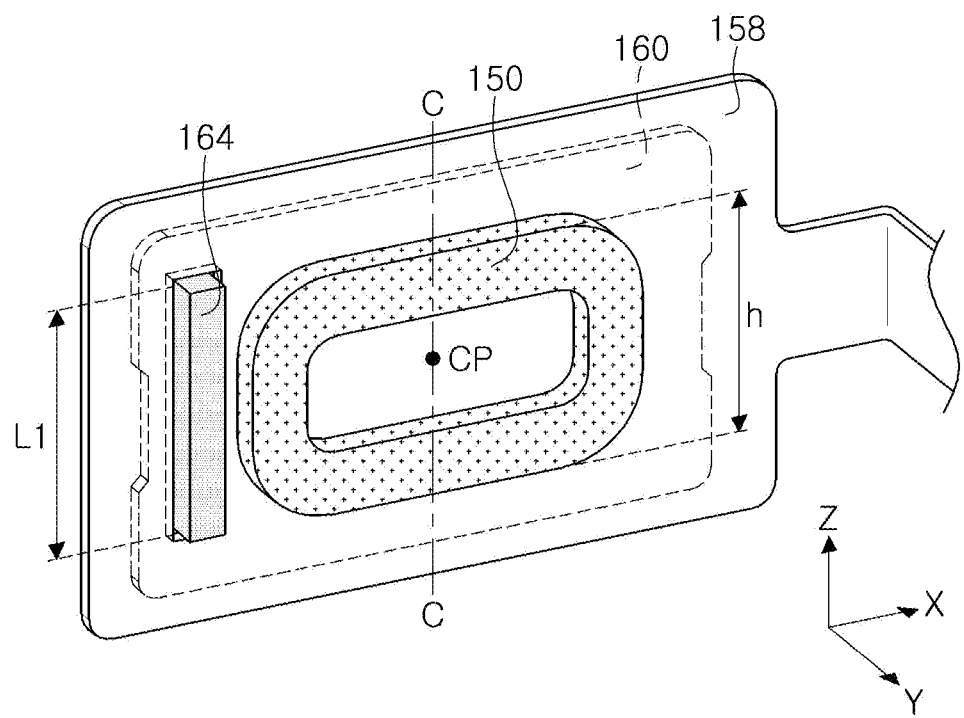
FIG. 7 is a perspective view of a yoke member according to an example.

The yoke member 160 of FIG. 7 is distinguished from the examples described above in that a protrusion 164 is positioned outside of the coil 150. That is, the protrusion 164 may be disposed out of the coil 150 to completely deviate from the winding center CP of the coil 150. The protrusion 164 may be configured to exert biased magnetic force in the optical axis direction of the lens module 120. To this end, the protrusion 164 may be elongated in the optical axis direction C-C.

Since the yoke member 160 configured as described above has the protrusion 164 elongated in the optical axis direction (over a length L1), even though the first magnet 140 moves together with the lens module 120 in the optical axis direction, biased magnetic force may be generated between the first magnet 140 and the yoke member 160.

Next, another example of the yoke member will be described with reference to FIG. 8.

Figure 8:
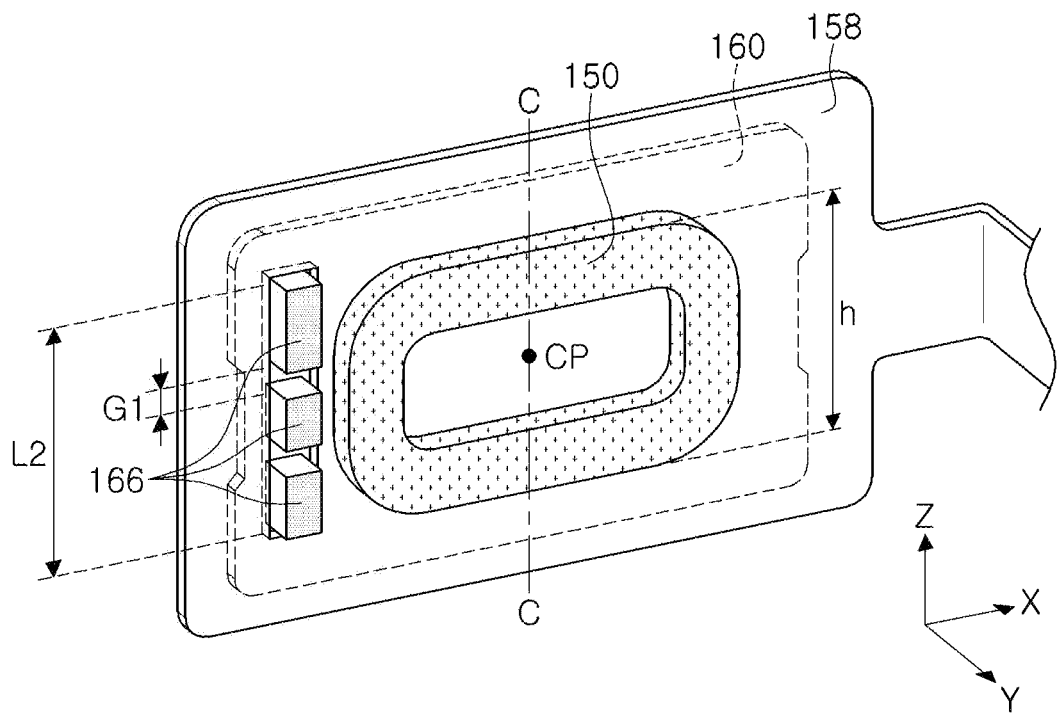
FIG. 8 is a perspective view of a yoke member according to an example.

The yoke member 160 of FIG. 8 is distinguishable from those examples described above in the arrangement position and the number of protrusions 166. The protrusions 166 may be disposed outside of the coil 150 to deviate from the winding center CP of the coil 150 and to be completely biased to the left. Furthermore, a plurality of protrusions 166 may be spaced apart from each other by a predetermined gap G1 in the optical axis direction C-C.

A length L2 from an upper end of the uppermost protrusion 166 to a lower end of the lowermost protrusion 166 may be the same as or smaller than an extension length h of the coil 150 in the optical axis direction. Furthermore, the gap G1 between adjacent protrusions 166 may not be greater than a length of the protrusion 166 in a short axis direction of the protrusion 166.

Since the yoke member 160 configured as described above has the plurality of protrusions 166 spaced apart from each other by the gap G1 in the optical axis direction, even though the position of the lens module 120 is changed, biased magnetic force may be generated between the first magnet 140 and the yoke member 160.

Next, another example of the yoke member will be described with reference to FIG. 9.

Figure 9:
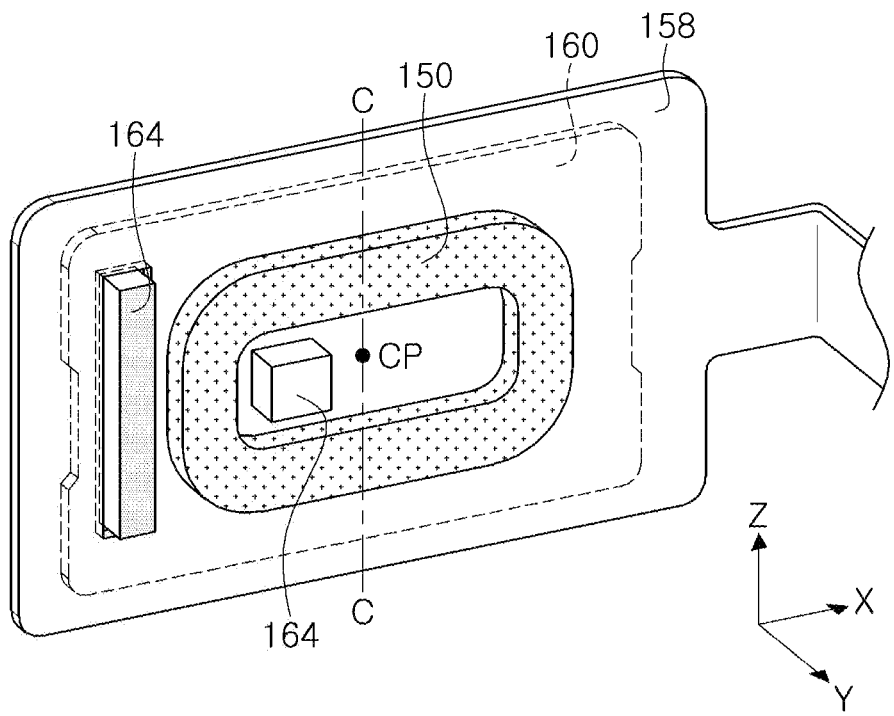
FIG. 9 is a perspective view of a yoke member according to an example.

The yoke member 160 of FIG. 9 is distinguished from those examples described above in the arrangement form of protrusions 164. For example, in FIG. 9, the protrusions 164 may be formed in an inner space surrounded by the coil 150 and outside of the coil 150, respectively.

Since the yoke member 160 configured as described above has the plurality of protrusions 164 intensively arranged on one side of the winding center CP of the coil 150, a magnitude of the biased magnetic force generated between the first magnet 140 and the yoke member 160 may be increased.

Next, another example of the yoke member will be described with reference to FIG. 10.

Figure 10:
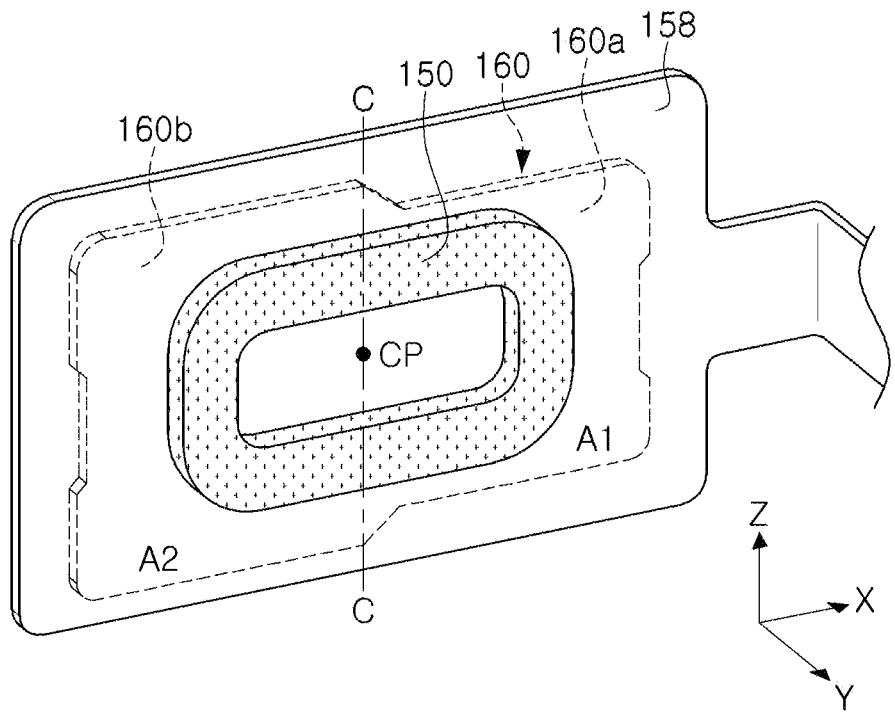
FIG. 10 is a perspective view of a yoke member according to an example.

The yoke member 160 of FIG. 10 is distinguished from the examples described above in an overall shape of the yoke member 160. For example, the yoke member 160 may have left and right areas which are asymmetrical around the optical axis C-C, as illustrated in FIG. 10. That is, an area A1 of a right portion 160a of the yoke member 160 may be smaller than an area A2 of a left portion 160b of the yoke member 160. Therefore, the left portion 160b of the yoke member 160 may have a stronger attraction force with the first magnet 140 than the right portion 160a of the yoke member 160.

Since the yoke member 160 configured as described above does not have a separate component formed on or coupled to a surface of the yoke member 160, a process of manufacturing the camera module 100 may be simplified.

Next, another example of the yoke member will be described with reference to FIG. 11.

Figure 11:
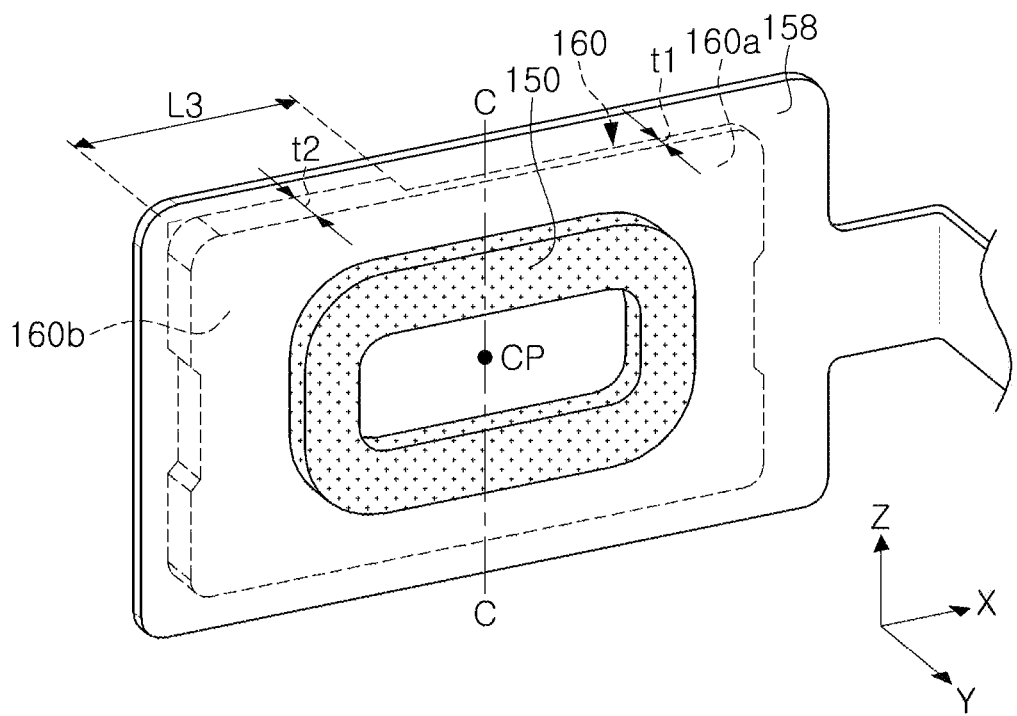
FIG. 11 is a perspective view of a yoke member according to an example.

The yoke member 160 of FIG. 11 is distinguished from the examples described above in an overall shape of the yoke member 160. The yoke member 160 may have a left and right asymmetrical shape around the optical axis C-C, as illustrated in FIG. 11. For example, the yoke member 160 may have left and right masses different from each other with respect to the winding center CP of the coil 150, as illustrated in FIG. 11.

The mass of the right portion 160a of the yoke member 160 may be smaller than the mass of the left portion 160b of the yoke member 160. To this end, a first thickness t1 of the right portion 160a of the yoke member 160 may be smaller than a second thickness t2 of the left portion 160b of the yoke member 160. A portion having the second thickness t2 may have a predetermined length L3. For example, the portion having the second thickness t2 may generally extend to the winding center CP of the coil 150.

Since the yoke member 160 configured as described above has the mass of the left portion 160b greater than the mass of the right portion 160a, an attraction force caused between the left portion 160b and the first magnet 140 may be greater than an attraction force caused between the right portion 160a and the first magnet 140.

Figure 12:
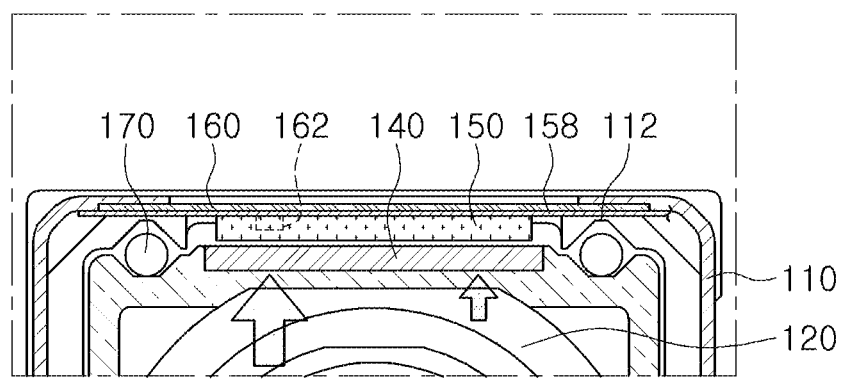
FIG. 12 is a schematic view illustrating an attraction force relationship between a magnet and a yoke member.
Figure 13:
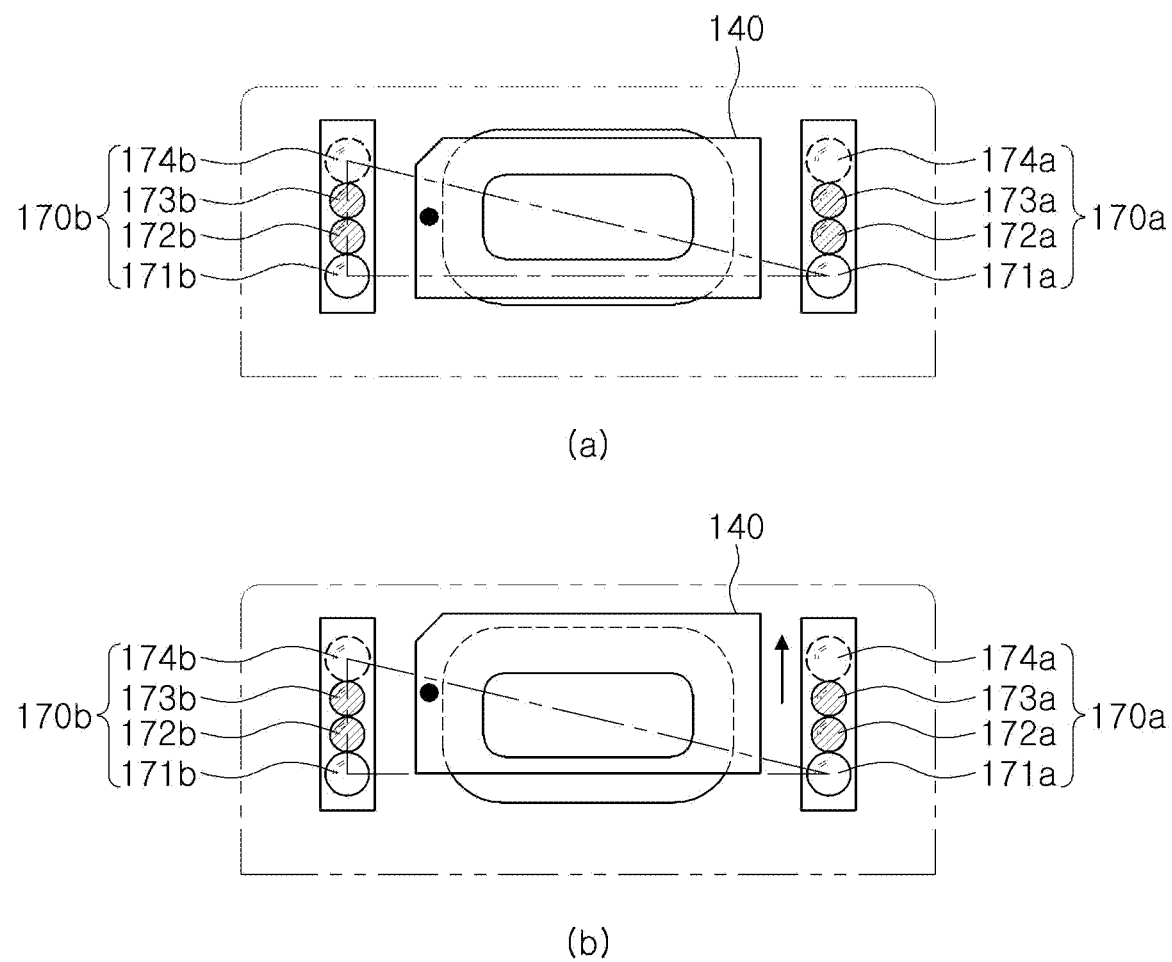
FIG. 13 is a schematic view illustrating a contact relationship between a lens barrel and a bearing member.
Figure 14:
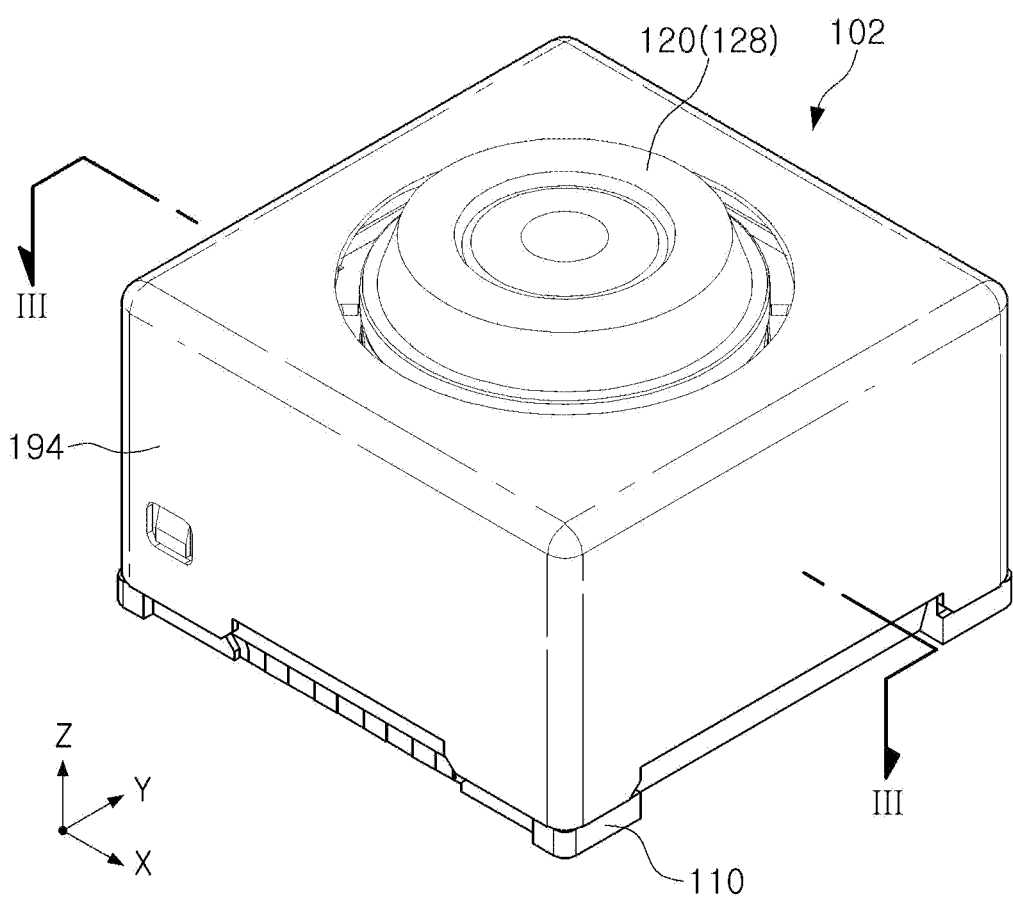
FIG. 14 is an assembled perspective view of a camera module according to an example.
Figure 15:
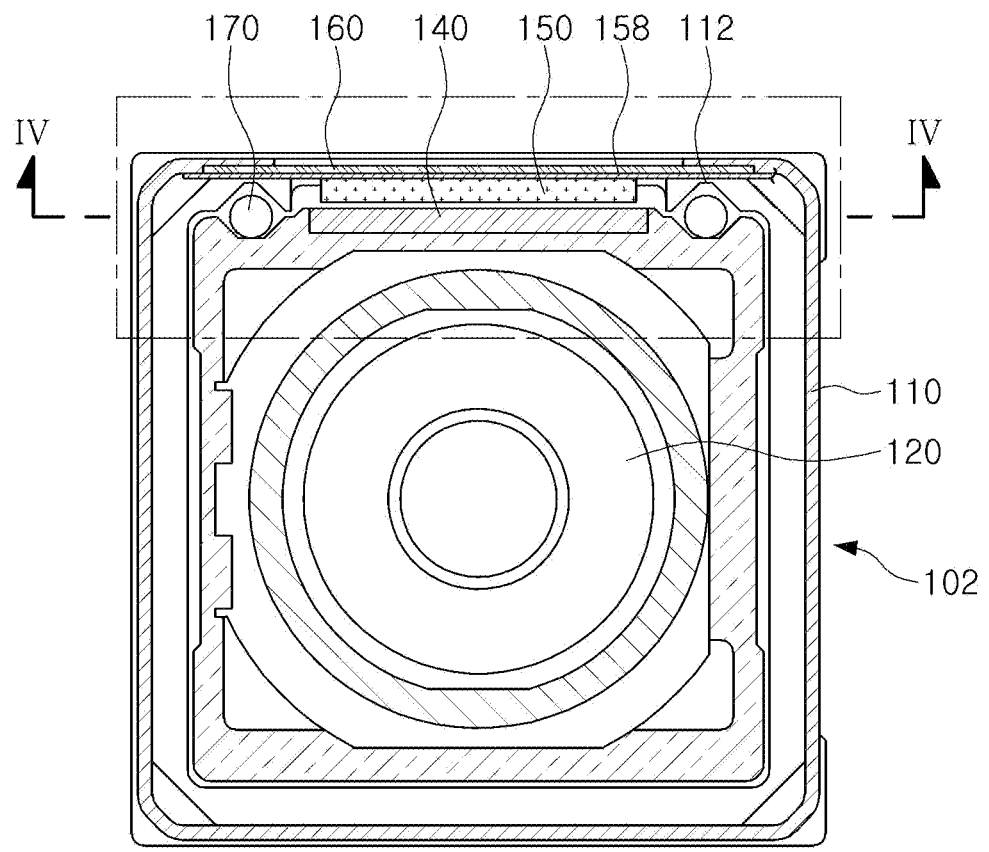
FIG. 15 is a cross-sectional view of the camera module taken along line III-III of FIG. 14.

Next, characteristics according to the driving of the lens module of the camera module according to various examples will be described with reference to FIGS. 12 and 13.

The camera module 100 may move the lens module 120 in the optical axis direction as described above. For example, the lens module 120 may be moved upwardly or downwardly in the optical axis direction by the interaction of the first magnet 140 and the coil 150. The lens module 120 may be smoothly moved by rolling friction with the bearing members 170. For example, the lens module 120 may be moved while being in point contact with or in line contact with the bearing members 170.

The camera module 100 may minimize the rattling (or the tilting phenomenon) occurring when the lens module 120 is moved. In the camera module 100 according to the present exemplary embodiment, a biased attraction force may be caused between the first magnet 140 and the yoke member 160 of the lens module 120. For example, the lens module 120 may move in the optical axis direction in a state in which the lens module 120 is adjacent to the right portion or the left portion of the yoke member 160.

In the camera module 100, the lens module 120 may move in the state in which the lens module 120 is adjacent to the left portion of the yoke member 160, by the attraction force generated between the protrusion 162 and the first magnet 140.

The lens module 120 may be selectively in contact with the bearing members 170a and 170b by the biased attraction force of the first magnet 140 and the yoke member 160. For example, the lens module 120 may be always in contact with bearings 171b, 172b, 173b, and 174b disposed on the left side of the lens module 120, but may be selectively in contact with bearings 171a, 172a, 173a, and 174a disposed on the right side of the lens module 120.

The contact structure between the lens module 120 and the bearing members 170a and 170b as described above may significantly alleviate the rattling (the tilting phenomenon) occurring when the lens module 120 is moved, because the lens module 120 is supported by the plurality of bearings 171a, 171b, 172b, 173b, and 174b.

Next, a camera module according to another example will be described with reference to FIGS. 14 through 17. A description of members having like reference numerals to the examples discussed above may be omitted hereafter.

A camera module 102 may include a housing 110 and a lens module 120. As in the camera module 100 described above, the lens module 120 may include a first frame, a second frame, a third frame, and a lens barrel 128.

The lens module 120 may be configured to move in an optical axis direction (Z direction). A bearing member 170 may be disposed between the housing 110 and the lens module 120 to smoothly move the lens module 120 in the optical axis direction. The bearing members 170 may be disposed between a groove (guide portion 112) of the housing 110 and a groove of the lens module 120.

The camera module 102 may include a first magnet 140 and a first coil 150 to move the lens module 120 in the optical axis direction. The first magnet 140 may be disposed on the lens module 120, and the coil 150 may be disposed on the housing 110. The camera module 102 may include a flexible circuit board 158 for supplying a current to the coil 150. The flexible circuit board 158 may be disposed on one surface of the housing 110. A yoke member 160 capable of generating a magnetic force of a predetermined magnitude with the first magnet 140 may be disposed on the flexible circuit board 158.

Figure 16:
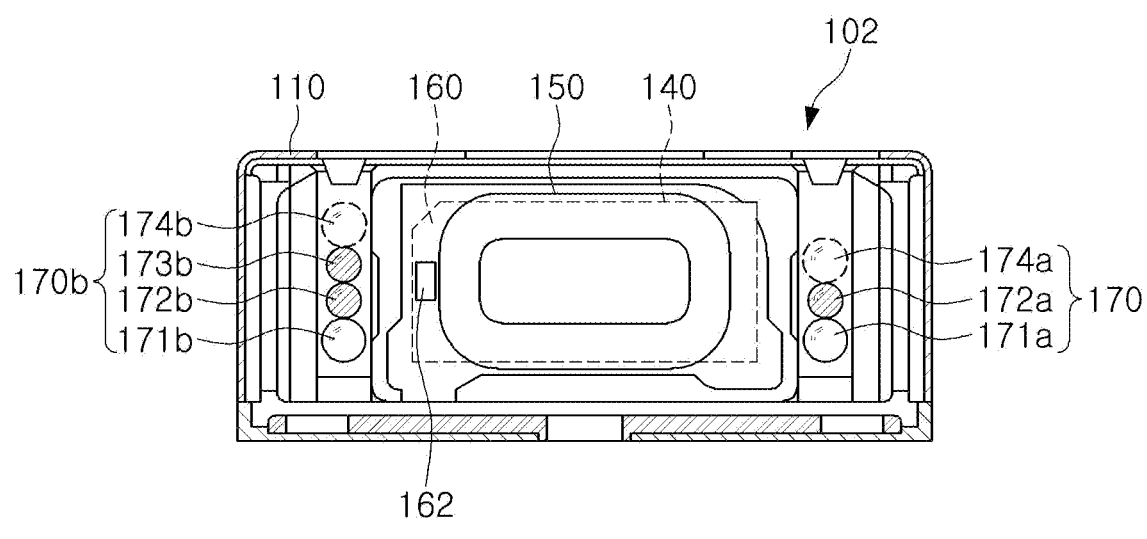
FIG. 16 is a cross-sectional view of the camera module taken along line IV-IV of FIG. 15.

The camera module 102 may include components for generating biased magnetic force between the first magnet 140 and the yoke member 160 of the lens module 120. For example, the camera module 102 may include a protrusion 162 formed on the yoke member 160 as illustrated in FIG. 16. The protrusion 162 may be disposed outside of the coil 150 to easily form biased magnetic force with the first magnet 140.

The camera module 102 may include the bearing members 170 to move the lens module 120 in a biased manner in the optical axis direction. The bearing member 170 may include first bearings 172a, 172b, and 173b of a first size and second bearings 171a, 174a, 171b, and 174b of the second size. The bearing members 170 may be asymmetrically disposed on left and right sides with respect to the first magnet 140 and the first coil 150. As an example, the three bearings 171a, 172a, and 174a may be disposed on the right side of the first magnet 140, and the four bearings 171b, 172b, 173b and 174b may be disposed on the left side of the first magnet 140. More specifically, the first bearings 172a, 172b, and 173b may be arranged in a different number on the right and left sides of the first magnet 140 and the first coil 150, but the second bearings 171a, 174a, 171b, and 174b may be arranged in the same number on the left and right sides of the first magnet 140 and the first coil 150. As another example, the two second bearings 171a and 174a on the right side of the first magnet 140 may be arranged to have a gap therebetween that is smaller than a height of the first magnet 140 or the coil 150, and the two second bearings 171b and 174b on the left side of the first magnet 140 may be arranged to have a gap therebetween that is substantially equal to the height of the first magnet 140 or the coil 150.

Figure 17:
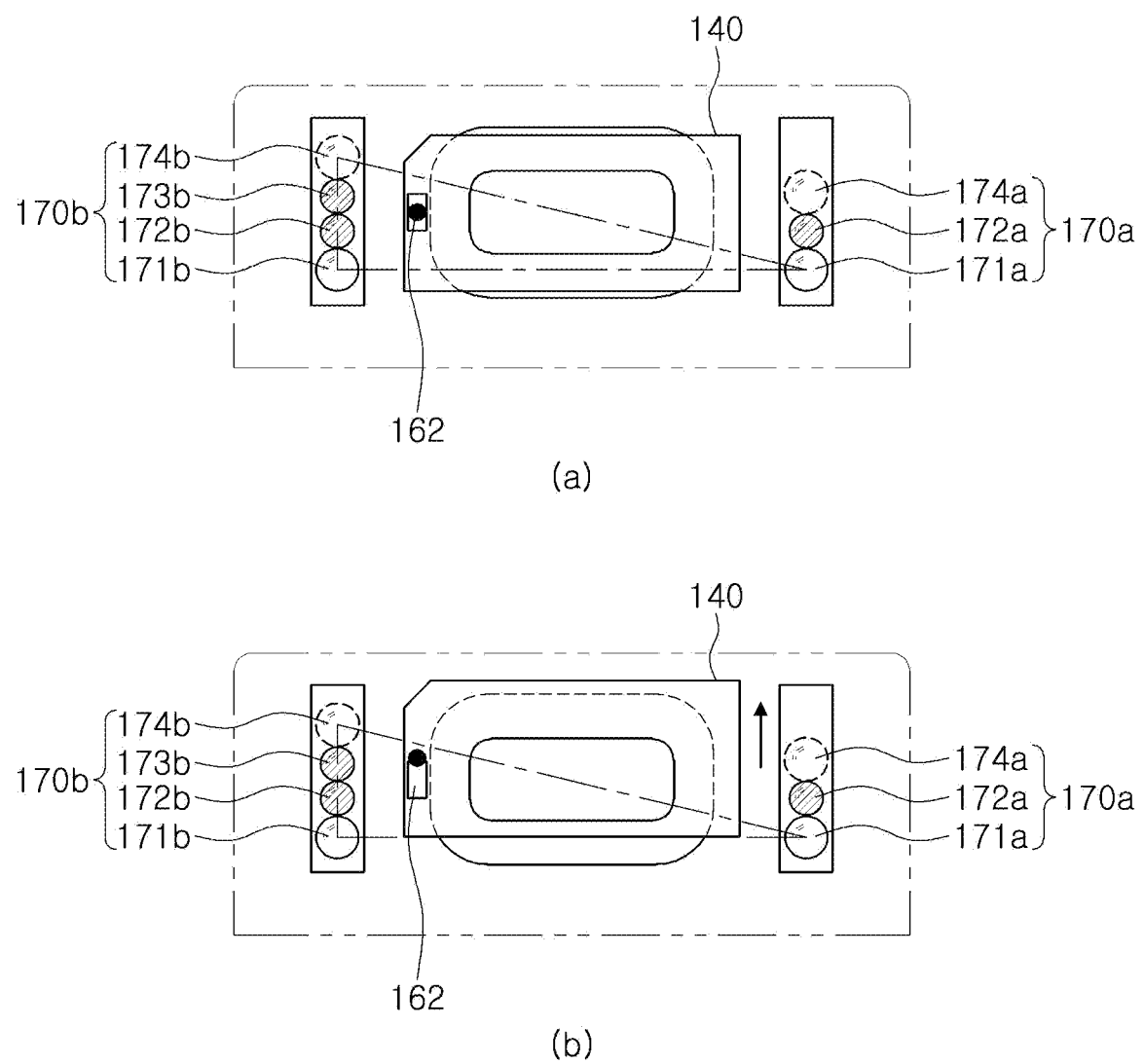
FIG. 17 is a schematic view illustrating a contact relationship between a lens barrel and a bearing member.

The bearing members 170 disposed as described above may smoothly support the movement of the lens module 120 in the optical axis direction according to the biased magnetic force, as illustrated in FIG. 17. More specifically, the bearings 171a, 172a, and 174a disposed on the right side of the first magnet 140 may be configured to minimize a rolling-contact section with the lens modules 120, and the bearings 171b, 172b, 173b, and 174b disposed on the left side of the first magnet 140 may be configured to maximize a rolling-contact section with the lens modules 120, thereby alleviating rattling (a tilting phenomenon) caused by the movement of the lens module 120 in the optical axis direction.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a magnet disposed on a lens module;
    a bearing member disposed in a ball guide portion formed between the lens module and a housing that accommodates the lens module;
    a coil disposed in the housing to face the magnet; and
    a yoke member disposed on the housing and configured to interact with the magnet to generate a biased magnetic force in a direction transverse to an optical axis direction of the lens module.

2. The camera module of claim 1, wherein the yoke member is asymmetrical with respect to an optical axis of the lens module.

3. The camera module of claim 1, wherein the yoke member comprises a protrusion that protrudes toward the magnet.

4. The camera module of claim 3, wherein the protrusion is disposed inside of a winding of the coil.

5. The camera module of claim 3, wherein the protrusion is disposed outside of a winding of the coil.

6. The camera module of claim 1, wherein the yoke member has a first surface area in a first region disposed on a first side of an optical axis of the lens module and a second surface area different from the first surface area in a second region disposed on a second side of the optical axis opposite the first side.

7. The camera module of claim 1, wherein the yoke member has a first mass in a first region disposed on a first side of an optical axis of the lens module and a second mass different from the first mass in a second region disposed on a second side of the optical axis opposite the first side.

8. The camera module of claim 1, wherein the bearing member is disposed in the optical axis direction of the lens module.

9. The camera module of claim 8, wherein the bearing member comprises:
    first bearings of a first size; and
    second bearings of a second size greater than the first size.

10. The camera module of claim 9, wherein the first bearings are disposed between a first one of the second bearings and a second one of the second bearings along the optical axis direction.

11. The camera module of claim 10, wherein the first bearings comprise a first set of the first bearings disposed on a first side of the yoke member and a second set of the first bearings disposed on a second side of the yoke member opposite the first side, a number of first bearings in the first set being different than a number of first bearings in the second set.

12. The camera module of claim 10, wherein the second bearings comprise a first set of the second bearings disposed on a first side of the yoke member and a second set of the second bearings disposed on a second side of the yoke member opposite the first side, a number of second bearings in the first set being the same as a number of second bearings in the second set.

13. A camera module comprising:
a lens module configured to move by rolling friction in an optical axis direction;
a magnet and a coil configured to provide a driving force required to move the lens module in the optical axis direction;
a yoke member disposed to face the magnet; and
a protrusion disposed on the yoke member and disposed closer to the magnet than the yoke member.

14. The camera module of claim 13, wherein the protrusion is biased toward one side of the yoke member.

15. The camera module of claim 13, wherein the protrusion comprises protrusions disposed with a gap therebetween in the optical axis direction.

16. A camera module comprising:
a housing comprising a yoke and a coil disposed on the yoke; and
a lens module comprising a magnet disposed to face the coil and configured to interact with the coil to move the lens module within the housing along a direction of an optical axis of the lens module,
wherein the yoke is asymmetrical with respect to the optical axis in at least one of a surface area of a surface on which the coil is disposed, a mass, and a shape.

17. The camera module of claim 16, wherein the yoke comprises a protrusion protruding from the surface on which the coil is disposed toward the magnet, and the protrusion is offset with respect to the optical axis.

18. The camera module of claim 17, wherein the protrusion is disposed between a portion of the coil and the optical axis.

19. The camera module of claim 17, wherein the protrusion is disposed farther away from the optical axis than the coil and extends in a direction parallel to the optical axis.

20. The camera module of claim 19, wherein a length of the protrusion in the direction parallel to the optical axis is less than or equal to an extension length of the coil in an optical axis direction.

* * * * *